United States Patent

Libman et al.

[11] Patent Number: 5,504,474
[45] Date of Patent: Apr. 2, 1996

[54] TAG FOR ELECTRONIC PERSONNEL MONITORING

[75] Inventors: Vadim Libman, Migdal Haemek; Doron Dovrat, Rosh Haain; Joseph Givati, Herzelia; Yoav Reisman, Raanana, all of Israel

[73] Assignee: Elmo Tech Ltd., Herzelia, Israel

[21] Appl. No.: 276,571

[22] Filed: Jul. 18, 1994

[51] Int. Cl.[6] .................................................. G08B 13/14
[52] U.S. Cl. ...................................... 340/572; 340/825.49
[58] Field of Search ..................................... 340/572, 573, 340/574, 575, 576, 825.49

[56] References Cited

U.S. PATENT DOCUMENTS

| | | | |
|---|---|---|---|
| 4,694,284 | 9/1987 | Leveille | 340/574 |
| 4,736,196 | 4/1988 | McMahon et al. | |
| 4,812,823 | 3/1989 | Dickerson | 340/572 |
| 4,885,571 | 12/1989 | Pauley | 340/573 |
| 4,918,432 | 4/1990 | Pauley et al. | |
| 4,924,211 | 5/1990 | Davies | |
| 4,952,913 | 8/1990 | Pauley et al. | |
| 4,999,613 | 3/1991 | Williamson | 340/573 |
| 5,075,670 | 12/1991 | Bower | 340/573 |
| 5,103,474 | 4/1992 | Stoodley et al. | |
| 5,115,223 | 5/1992 | Moody | 340/573 |
| 5,117,222 | 5/1992 | McCurdy | 340/573 |
| 5,170,426 | 12/1992 | D'Alessio | 340/573 |
| 5,189,395 | 2/1993 | Mitchell | 340/573 |
| 5,204,670 | 4/1993 | Stinton | 340/573 |
| 5,255,306 | 10/1993 | Melton | 340/573 |
| 5,266,944 | 11/1993 | Carroll | 340/573 |
| 5,298,884 | 3/1994 | Gilmore | 340/572 |

*Primary Examiner*—John K. Peng
*Assistant Examiner*—Albert K. Wong
*Attorney, Agent, or Firm*—Mark M. Friedman

[57] ABSTRACT

A tag for use with an electronic monitoring system for monitoring an object, which includes a housing enclosing electronic circuitry which includes a transmitter for transmitting a signal to a location remote from the tag, two straps connected to the housing and including an open electrical circuit, and a mechanism for mechanically and electrically connecting and locking the housing to a limb of the user which includes a base member and a cover member which, when forced together with the ends of the two straps between them, bring about an irreversible mechanical locking and simultaneously close the circuit running through the straps, preferably in a circuitous manner. In another embodiment, a secondary transmitter located in one of the straps transmits to a receiver located in the housing. Analysis of the received signals provides an indication of the proximity of the secondary transmitter to the object being monitored.

8 Claims, 4 Drawing Sheets

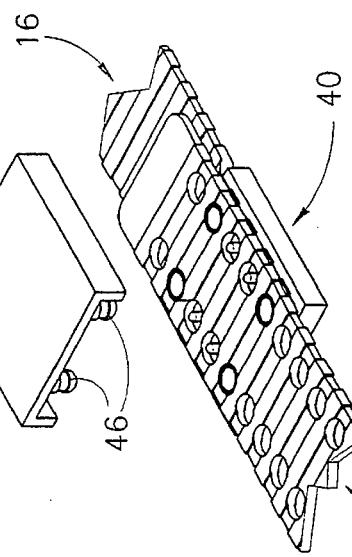
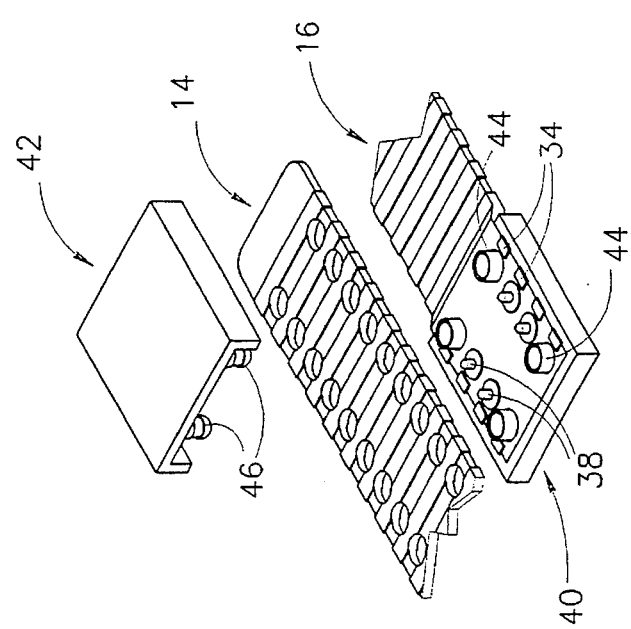
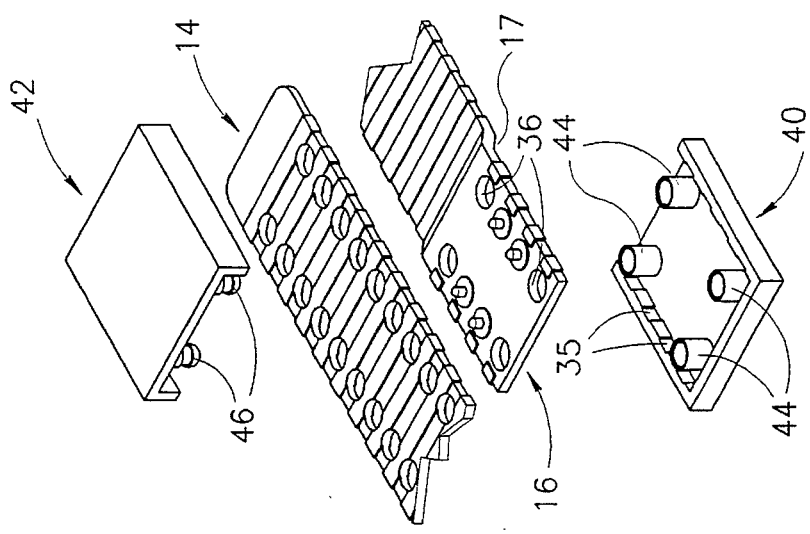

TAG FOR ELECTRONIC PERSONNEL MONITORING

FIELD AND BACKGROUND OF THE INVENTION

The present invention relates to tags for use with electronic personnel monitoring systems and, more particularly, to tags for house arrest or related personnel monitoring systems whereby a person wearing the tag can be monitored for compliance with orders to remain at a prescribed location.

With the increasing overcrowding and expenses of jails and houses of detention, it has become increasingly popular in recent years to sentence an offender, particularly a non-violent offender, to house arrest. Thus, the offender is required to stay in a predesignated location, such as his residence, the residence of a responsible relative or a certain rehabilitating institution, for a certain duration. In some cases the offender is allowed, or even encouraged, to work or to conduct a business and his confinement to the predesignated location is limited to non-working hours.

While house arrest offers certain advantages over confinement in jails and similar institutions, the use of house arrest raises a problem of monitoring for compliance with the orders.

Various systems have been devised for monitoring for compliance of house arrest orders. The most popular systems involve the use of a tag which includes a miniature transmitter. The tag is strapped to the ankle or wrist of the offender. Running through the strap is an electrical circuit which is designed in such a way that the tag cannot be detached by an unauthorized party without breaking the circuit and alerting the authorities. The transmitter broadcasts an encoded signal, typically at regular intervals, over a pre-determined range, which roughly coincides with the area of confinement. A receiver-dialer located in the location of confinement, such as the offender's home, detects the signals form the transmitter and reports, typically over a telephone line, to a central monitoring facility so that any interruption in signal detection, such as would occur when the offender wanders beyond the transmitter range or when the tag is removed from the offender, is communicated to the monitoring facility.

The effectiveness of the tag is thus seen to be dependent on the ability to attach the tag to the offender in such a way that the tag cannot be removed without alerting the authorities. One approach to help make the tag tamper-proof has been to improve the mechanical attachment of the two ends of the strap. An example of this is disclosed in U.S. Pat. No. 4,812,823. A disadvantage of the locking system disclosed therein is that it is relatively complex.

Another approach has been to augment the electric circuit system with an additional system for detecting the removal of the tag from the offender. An example of such a system is disclosed in U.S. Pat. No. 4,885,571 which uses a pair of capacitive electrodes, one of which is realized with a conductive strap, which function as the plates of a capacitor with the body flesh serving as the dielectric material. When the tag is removed from the body of the offender, the system detects the change and alerts the authorities.

There is thus a widely recognized need for, and it would be highly advantageous to have, a tag for use with personnel monitoring systems which has enhanced tamper-resistant properties.

SUMMARY OF THE INVENTION

According to the present invention there is provided a tag for use with an electronic monitoring system for monitoring an object, comprising: (a) a housing having electronic circuitry enclosed therein, the electronic circuitry including a primary transmitter for transmitting a signal to a location remote from the tag; (b) a first strap member having a free end and an end which is attached to the housing, the first strap member including a first portion of an electrical circuit, the first strap member including a plurality of longitudinally-arranged pairs of first strap holes; (c) a second strap member having a free end and an end which is attached to the housing, the second strap member including a second portion of an electrical circuit, the second portion of the electrical circuit being electrically connected to the first portion of the electrical circuit so as to form a circuit which is electrically continuous except that the circuit is electrically open near the free end of the second strap member, the second strap member including at least two pairs of longitudinally arranged second strap holes corresponding to the first strap holes, the second strap member further including at least one pair of contacts corresponding to the first strap holes, each of the contacts electrically connected to one end of the circuit, the contacts being located between the second strap holes; and (d) means for mechanically and electrically connecting and locking the housing around a limb of the object being monitored, the means including: (A) a base member including at least two pairs of longitudinally arranged hollow base member protrusions located so as to correspond to the at least two pairs of longitudinally arranged second strap holes and dimensioned to fit within the at least two pairs of second strap holes and first strap holes; and (B) a cover member including at least two pairs of longitudinally arranged cover member protrusions located so as to correspond to the at least two pairs of longitudinally arranged second strap holes and dimensioned to fit within the at least two pairs of longitudinally arranged hollow base member protrusions, the cover protrusions including means for locking such that when the cover protrusions are inserted into the hollow base member protrusions the base member and the cover member are permanently locked together, the cover member further including means for electrically connecting at least one of the at least one pair of contacts, so that when the base member hollow protrusions are passed through the at least two pairs of second strap and first strap holes and the cover member protrusions are inserted into the base member protrusions the housing is mechanically and electrically connected around a limb of the object being monitored.

Also according to the present invention, there is provided a tag for use with an electronic monitoring system for monitoring an object, comprising: (a) a housing having electronic circuitry enclosed therein, the electronic circuitry including a primary transmitter for transmitting a signal to a location remote from the tag and further including a short range receiver; (b) a first strap member having a free end and an end which is attached to the housing, the first strap member including a first portion of an electrical circuit; (c) a second strap member having a free end and an end which is attached to the housing, the second strap member including a second portion of an electrical circuit, the second portion of the electrical circuit being electrically connected to the first portion of the electrical circuit so as to form a circuit which is electrically continuous except that the circuit is electrically open near the free end of the second strap member, the second strap member including a secondary transmitter for transmitting signals to the short range receiver; (d) means for analyzing signals received by the short range receiver and for determining whether the secondary transmitter is in the immediate vicinity of the object being monitored; and (e) means for mechanically and electrically connecting and locking the housing around a limb of the object being monitored.

Further according to the present invention, there is provided a tag for use with an electronic monitoring system for monitoring an object, comprising: (a) a housing having electronic circuitry enclosed therein, the electronic circuitry including a primary transmitter for transmitting a signal to a location remote from the tag; (b) a first strap member having a free end and an end which is attached to the housing, the first strap member including a first portion of an electrical circuit, the first portion of the electrical circuit being in the form of a tortuous electrical conductor; (c) a second strap member having a free end and an end which is attached to the housing, the second strap member including a second portion of an electrical circuit, the second portion of the electrical circuit being electrically connected to the first portion of the electrical circuit so as to form a circuit which is electrically continuous except that the circuit is electrically open near the free end of the second strap member; and (d) means for mechanically and electrically connecting and locking the housing around a limb of the object being monitored.

According to further features in preferred embodiments of the invention described below, the two straps are permanently connected to, preferably integrally formed with, the housing.

According to still further features in the described preferred embodiments the electrical circuit includes an electrical conductor mounted on a flexible substrate.

The present invention successfully addresses the shortcomings of the presently known configurations by providing a tag for use in monitoring, such as in monitoring compliance of an offender with house arrest orders, which is easy to install and which, upon deployment, provides simultaneous electrical connection and irreversible mechanical connection.

For ease of exposition, systems according to the present invention are described herein in the context of enforcing house arrest of an offender. However, as will be readily apparent to the reader, systems according to the present invention, or systems which are quite similar, may also be utilized in other electronic monitoring applications, such as in enforcing domestic violence prevention orders and the monitoring of children or the disabled.

BRIEF DESCRIPTION OF THE DRAWINGS

The invention is herein described, by way of example only, with reference to the accompanying drawings, wherein:

FIGS. 2A–2D illustrate the steps in locking a tag according to the present invention: 2A—base member, cover member and two straps in exploded view; 2B—second strap member has been inserted into base member; 2C—first strap member has been placed over second strap member; 2D—cover member is in position completing the locking;

DESCRIPTION OF THE PREFERRED EMBODIMENTS

The present invention is of a tag for electronic monitoring, preferably electronic personnel monitoring which can be used to provide information as to whether the object or person is located where desired, and more specifically, the present invention is of a novel mechanism for irreversibly locking the tag onto the object and of further mechanisms to ensure that the tag is at all times kept on the object being monitored.

The principles and operation of a tag mechanisms according to the present invention may be better understood with reference to the drawings and the accompanying description.

Figure 1:
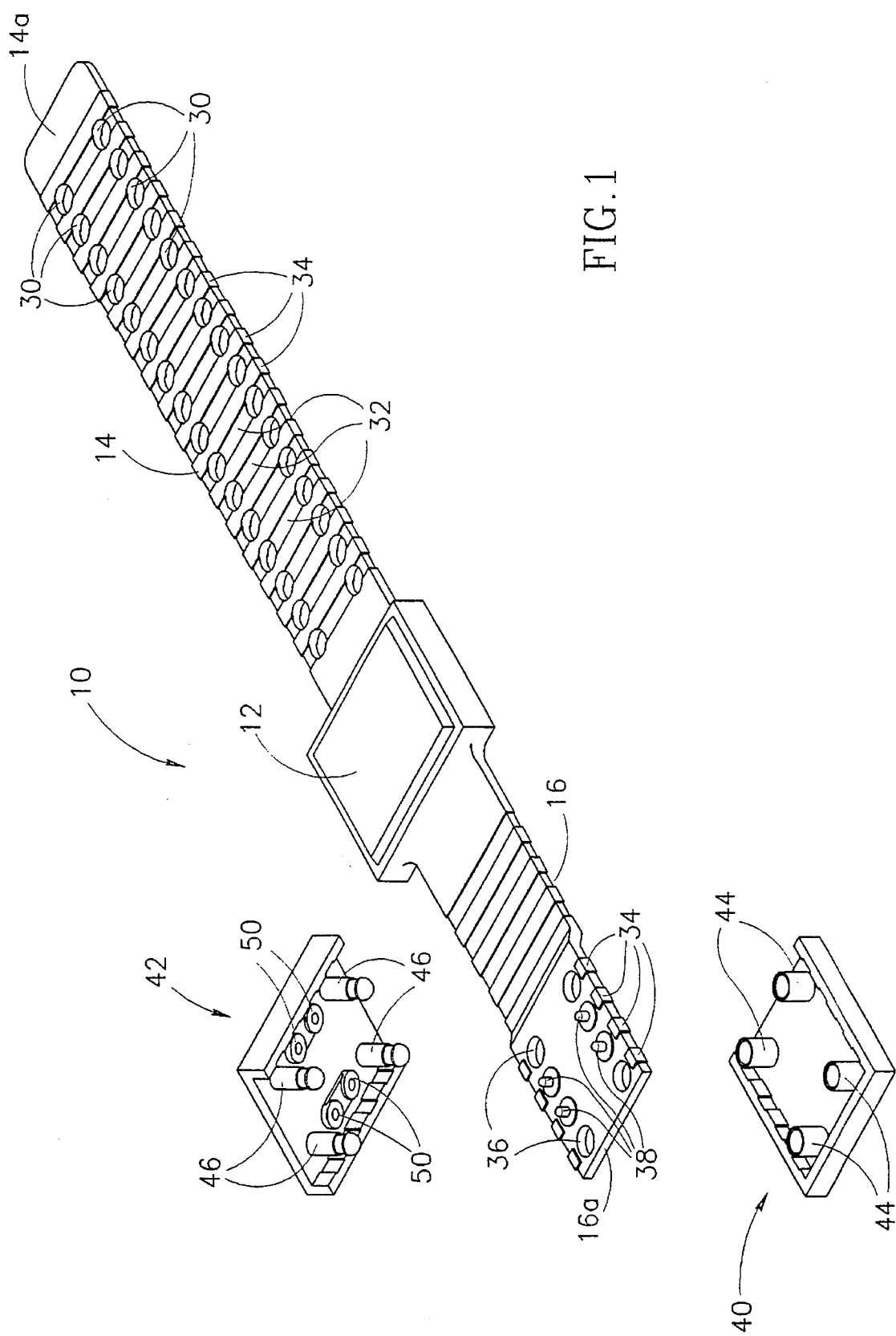
FIG. 1 shows a tag according to the present invention when not deployed and further shows a base member and a cover member.

Referring now to the drawings, FIG. 1 illustrates a typical tag according to the present invention. A tag, generally designated 10, includes a housing 12 and a pair of straps, which, for ease of description only, will be designated as first strap 14 and second strap 16.

In use, tag 10 is attached, with the use of straps 14 and 16, to the object to be monitored, for example, to the wrist or, preferably, to the ankle of an offender under house arrest. Housing 12 encloses electronic circuitry (not shown) which includes a primary transmitter (not shown) for transmitting a signal to a location (not shown) remote from tag 10. Typically the primary transmitter has a range of 25 to 75 meters and the remote location is a receiver-dialer which receives the signals and transmits information through telephone lines to a centralized monitoring station.

First strap 14 has a free end 14a and an end which is attached to housing 12. Second strap 16 has a free end 16a and an end which is attached to housing 12.

The attachment of first strap 14 and/or second strap 16 to housing 12 is preferably permanent, most preferably, first strap 14 and/or second strap 16 are integrally formed with housing 12 as through injection molding of both housing 12 and straps 14 and 16 in the same production step. Such a construction protects the connection between the various components of straps 14 and 16, described below, and the electronic components enclosed in housing 12 and prevent malfunctions which might otherwise occur when tag 10 is repeatedly exposed to water of various temperatures and to other inhospitable elements.

First strap 14 and second strap 16 include a first portion 18 (FIG. 4) and a second portion 20 (FIG. 5), respectively of an electrical circuit, with the two portions being connected to each other through suitable connections (contacts are designated as 22 and 24 in FIGS. 4 and 5, respectively) running through housing 12. Preferably, either or both portions of the electrical circuit are tortuous, for example as shown in FIG. 4 which shows first portion 18.

Preferably, one or, most preferably, both portions, 18 and 20, of the electrical circuit include an electrical conductor mounted on a flexible substrate which allows straps 14 and 16 to easily bend without damaging the conductor and simplifies the process of molding the strap bodies around the electrical circuit.

Figure 4:
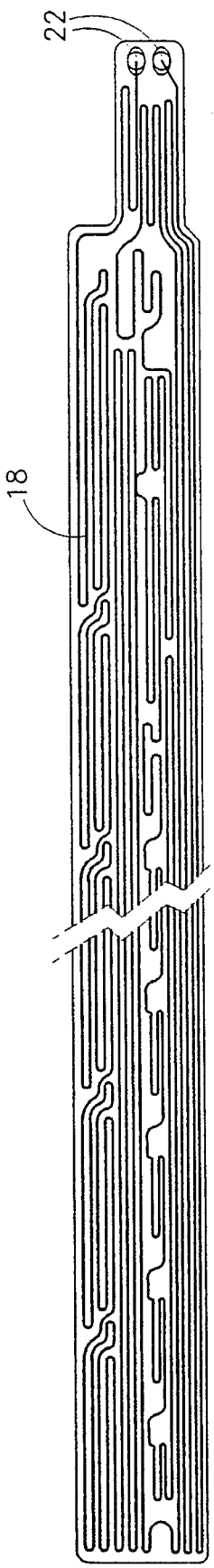
FIG. 4 illustrates a torturous electrical circuit which might be used in one or both of the strap.

First portion 18 of the electrical circuit includes a continuous electrical conductor whose two ends are connected to contacts 22 (FIG. 4). Second portion 20 of the electrical circuit is electrically connected at contacts 24 (FIG. 5) to first portion 18 through electrical connections (not shown) running through housing 12, and is connected to a suitable electrical power supply, such as a battery (not shown) located in housing 12.

The electrical circuit is open only at a single point, near the free end 16a of second strap 16 (FIG. 5) where the two ends of the circuit are connected to a primary electrical contacts 26. Preferably, the electrical circuit is further connected in parallel to secondary electrical contacts 28 which enhances the electrical closing of the circuit, as described in more detail below. Upon deployment of tag 10 the electrical is closed as described in more detail below. Any subsequent breaking of the circuit produces an alert which is sent to the monitoring station.

The electrical circuit is thus intended to ensure that tag 10 is not removed from the object being monitored, as by cutting one of the straps 14 or 16. Using a tortuous path for the electrical conductor, which greatly increases the uncertainty as to the actual location of the conductor, further discourages a sophisticated offender from attempting to electrically connect two portions of the circuit and then cutting the strap between the two connection points.

First strap 14 includes a number of pairs of first strap holes 30. Only four of these actually participate in the locking of straps 14 and 16 in the configuration shown in the Figures. Preferably, a relatively large number of first strap holes 30 are provided so that tag 10 may be secured to objects, such as a human ankle, of various sizes.

Preferably, first strap 14 and second strap 16 preferably include a number of ridges 32 over at least a portion of their top and bottom surfaces whose function is described below in more detail. Furthermore both first strap 14 and the distal portion of second strap 16 may, if desired, include transversely extending protrusions 34 whose function is described in more detail below.

Figure 5:
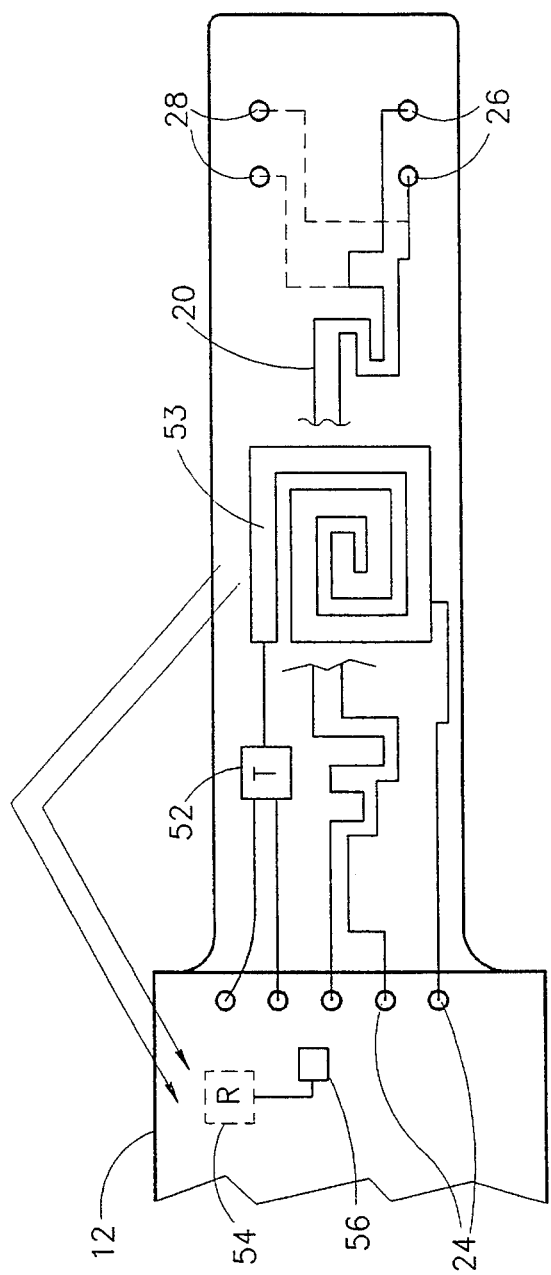
FIG. 5 illustrates a secondary transmitter and a nearby short range receiver.

Second strap 16 includes at least two pairs of second strap holes 36 (two pairs are used in the Figures) which are located to correspond to first strap holes 30. Located between second strap holes 36 at positions corresponding to first strap holes 30 are at least one pair of second strap external contacts 38. Each pair of second strap external contacts 38 is electrically connected to primary electrical contacts 26 or 28 (FIG. 5).

A device according to the present invention further includes means for mechanically and electrically connecting and locking housing 12 around a limb of the object being monitored. The means include a base member 40 and a cover member 42 which are designed to interlock with each other.

Base member 40 includes at least two pairs of longitudinally arranged hollow base member protrusions 44 (four are used in the embodiment illustrated). Base member protrusions 44 are located so as to correspond to second strap holes 36 and are dimensioned to fit within second strap holes 36 and first strap holes 30 as described in more detail below.

Cover member 42 cover member protrusions 46 located so as to correspond to second strap holes 36 and dimensioned to fit within the hollow portions of base member protrusions 44. Cover member protrusions 46 include means for locking such that when cover protrusions 46 are inserted into hollow base member protrusions 44 base member 40 and cover member 42 are permanently locked together. Preferably, the means include an enlarged head at the distal ends of cover member protrusions 46 which are designed to be slightly deformed temporarily upon insertion into hollow base member protrusions 44. Base member protrusions 44 are preferably include two sections—a distal section having a diameter which is slightly smaller than that of the heads of cover member protrusions 46 and a near section which has a diameter which is somewhat larger than that of the heads of cover member protrusions 46. In this way, once the head of cover member protrusion 46 clears the anterior portion of hollow base member protrusion 44, the head is able to expand and lock permanently into place so that only by breaking off cover member protrusion, or its head, is it possible to separate base member 40 from cover member 42.

Cover member 42 further includes means for electrically connecting second strap external contacts 38 so that when base member hollow protrusions 46 are passed through second strap holes 36 and first strap holes 30 and cover member protrusions 46 are inserted into base member protrusions 44 housing 12 is mechanically and electrically connected around a limb of the object being monitored.

The operation of a device according to the present invention can be better understood with reference to FIGS. 2A–2D, 3A and 3B which illustrate how tag 10 may be deployed.

FIG. 2A is an exploded view of the four members which are to be connected together—base member 40, second strap 16, first strap 14 and cover member 42. As a first step, second strap is inserted into base member 40 so that base member protrusions 44 extend through second strap holes 36. It is to be noted that transversely extending protrusions 34 of second strap 16, if present, fit slidably into corresponding grooves 35 on the inside side wall of base member 40.

It is to be further noted that preferably, the distal portion of second strap 16 is slightly elevated from the rest of second strap. This can be seen, for example, in FIG. 2A which shows a small ramp 17 which forms the transition between the distal and main portions of second strap 16. It will be observed that the elevation of the distal end of second strap 16 provides for a substantially flush back surface when base member 40 is attached to second strap (see FIG. 2B), which adds to the comfort of the wearer.

At this point first strap 14 is placed over base member protrusions 44 which extend through second strap holes 36 beyond second strap 16, as shown in FIG. 2C. The precise first strap holes 30 used are selected so that the overall effective size of combined straps is sufficiently long so as to not inconvenience the wearer and yet sufficiently short to ensure that the device cannot be slipped off the wrist or ankle of the user.

With base member 40, second strap 16 and first strap 14 temporarily combined as in FIG. 2C, cover member 42 is now placed over the assemblage so that cover member protrusions 46 are inserted into the hollow portions of base member protrusions 44. As described above, once cover member protrusions 46 are inserted sufficiently into base member protrusions 44, cover member 42 and base member 40 are permanently connected and the connection can only be undone by breaking cover member 42. Furthermore, concomitant with the insertion of cover member protrusions 46 into base member protrusions 44, second strap external contacts 38 are brought into contact with an electrically conductive element 50 (FIG. 1) which effectively closes the electrical circuit running through first strap 14, second strap 16 and housing 12. Two electrically conductive elements 50 are indicated in FIG. 1. Each provides electrical contact between an adjoining pair of second strap external contacts 38.

Electrically conductive element 50 can be of any convenient design. Preferably, electrically conductive element 50 is made of a suitable electrically conductive rubber or similar material, for example, a rubber doped with carbon particles, and is shaped to accommodate second strap external contacts 38 in such a way that good electrical contact is established and maintained even when the various members move slightly relative to each other.

Figure 2D:
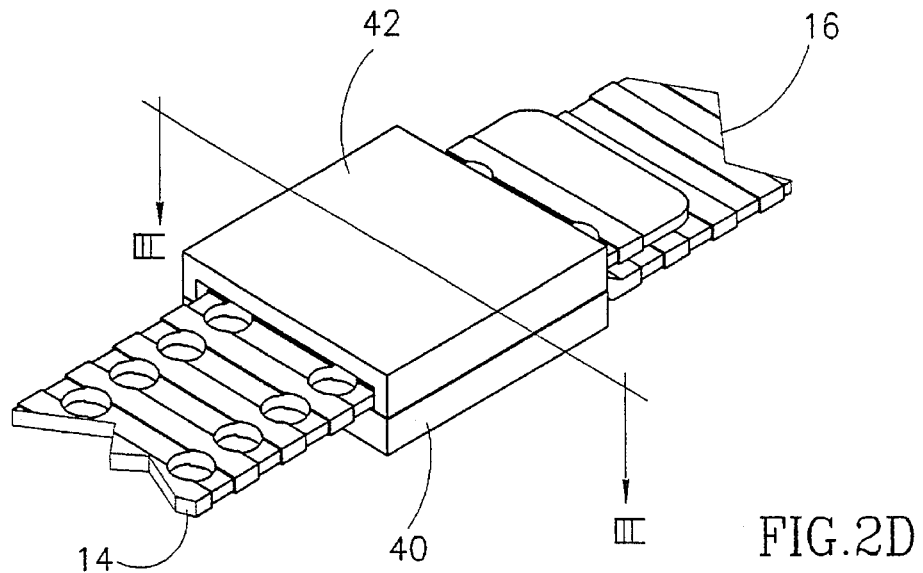
Figure 3A:
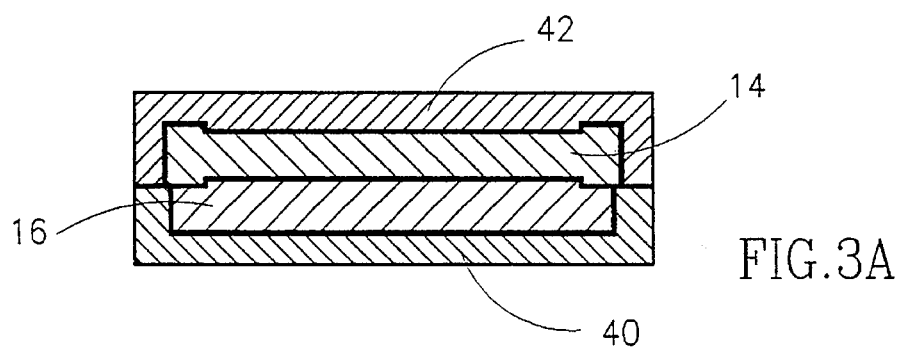
FIGS. 3A and 3B show two cross-sectional view of the configuration of FIG. 2D.
Figure 3B:
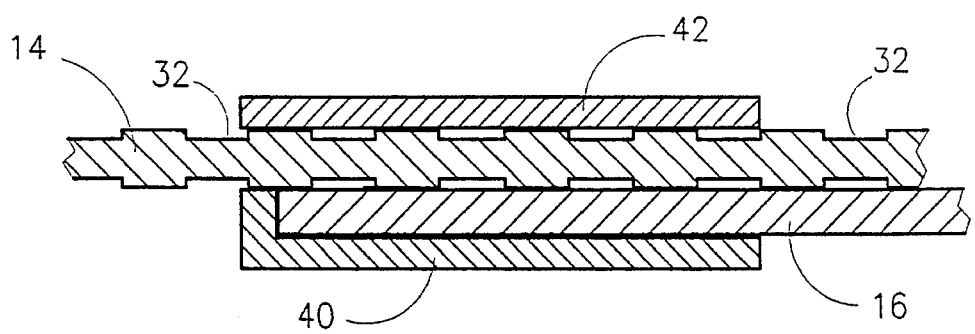

The engagement described is designed to minimize relative movement of the various elements so as to maintain good electrical contact throughout. To further immobilize the various elements, ridges 32 of first strap 14 and dimensioned to interlock with portions of transversely extending protrusions 34 so as to make it more difficult for straps 14 and 16 to slide relative to each other, as can be seen in the two cross-sectional views of the mechanism of FIG. 2D shown in FIGS. 3A and 3B.

Preferably, a tag according to the present invention, or a similar tag, is equipped with an additional mechanism for detecting the removal of tag 10. The additional mechanism includes a transmitter and a receiver positioned in two different places, a few centimeters apart, inside the unit for transmitting and receiving, respectively, RF signals. The received signal's frequency and strength is related to the presence of flesh near the transmitting unit.

The additional mechanism, illustrated schematically in FIG. 5, includes a secondary transmitter 52 preferably located in second strap 16 and is connected to a transmitting antenna 53 which is preferably also located in second strap 16 in the vicinity of housing 12. Transmitter 52 is held close to the wearer's flesh, but need not be in direct contact with the skin. Transmitter 52 is made of discrete components assembled together on a flexible board. The flexible board further includes looped electrical conductors, which determine the transmission frequency, and an area covered with conductive material which serves as antenna 53 and determines the strength of the signal sent into the atmosphere.

When transmitter 52 is away from the flesh the produced transmission is produced at a certain strength level and frequency. When transmitter 52 is near the flesh with antenna 53 substantially parallel to the body, as would be the case when tag 10 is closed around a limb, the basic transmission frequency increases in one direction and the signal strength falls.

Housing 12 includes a short range receiver 54 for receiving signals transmitted by antenna 53. Receiver 54 is independent of transmitter 52. Housing 12 further includes a suitable mechanism 56, such as a microprocessor, for analyzing signals received by short range receiver 54 and for determining whether secondary transmitter 52, and therefore, tag 10, is located in the immediate vicinity of the object being monitored, such as the ankle of the offender. Receiver 54 is tuned to the appropriate frequency. When a discrepancy between the basic transmission frequency and that of the transmission received by receiver 54 is detected and is determined to be greater than some predetermined value, the device is able to determine that tag 10 is being worn by the user. Otherwise, an alert is transmitted indicating that tag 10 is no longer in the immediate proximity of the user. Thus, the mechanism described relies on the fact that transmissions will have detectably different characteristics depending on whether the transmission is made from immediately next to the skin of the offender or from a location which is somewhat removed.

While the invention has been described with respect to a limited number of embodiments, it will be appreciated that many variations, modifications and other applications of the invention may be made.

What is claimed is:

1. A tag for use with an electronic monitoring system for monitoring an object, comprising:

(a) a housing having electronic circuitry enclosed thereto, said electronic circuitry including a primary transmitter for transmitting a signal to a location remote from said tag;

(b) a first strap member having a free end and an end which is attached to said housing, said first strap member including a first portion of an electrical circuit, said first strap member including a plurality of longitudinally arranged pairs of first strap holes;

(c) a second strap member having a free end and an end which is attached to said housing, said second strap member including a second portion of said electrical circuit, said second portion of said electrical circuit being electrically connected to said first portion of said electrical circuit so as to form a circuit which is electrically continuous except that said electrical circuit is electrically open near said free end of said second strap member, said second strap member including at least two pairs of longitudinally arranged second strap holes corresponding to said first strap holes, said second strap member further including at least one pair of contacts corresponding to said first strap holes, each of said contacts electrically connected to one end of said electrical circuit, said contacts being located between said second strap holes, said second strap member further including a secondary transmitter, said housing further including a short range receiver for receiving signals transmitted by said secondary transmitter, the tag further including means for analyzing said signals transmitted by said secondary transmitter and received by said short range receiver and for determining whether said secondary transmitter is in the immediate vicinity of the object being monitored and for providing an indication when said secondary transmitter is not in the vicinity of the object, said means being located in said housing; and (d) means for mechanically and electrically connecting and locking said housing around a limb of the object being monitored, said means including:

(A) a base member including at least two pairs of longitudinally arranged hollow base member protrusions located so as to correspond to said at least two pairs of longitudinally arranged second strap holes and dimensioned to fit within said at least two pairs of second strap holes and first strap holes; and (B) a cover member including at least two pairs of longitudinally arranged cover member protrusions located so as to correspond to said at least two pairs of longitudinally arranged second strap holes and dimensioned to fit within said at least two pairs of longitudinally arranged hollow base member protrusions, said cover protrusions including means for locking such that when said cover protrusions we inserted into said hollow base member protrusions said base member and said cover member are permanently locked together, said cover member further including means for electrically connecting at least one of said at least one pair of contacts, so that when said base member hollow protrusions are passed through said at least two pairs of second strap and first strap holes and said cover member protrusions are inserted into said base member protrusions said housing is substantially simultaneously mechanically and electrically connected around a limb of the object being monitored, said signal of said primary transmitter being related to said electrical connection.

2. A tag as in claim 1, wherein said first strap and said second strap are permanently connected to said housing.

3. A tag as in claim 1, wherein said first strap and said second strap are integrally formed with said housing.

4. A tag as in claim 1, wherein said first and said second portions of said electrical circuit include an electrical conductor mounted on a flexible substrate.

5. A tag as in claim 1, wherein said first portion of said electrical circuit is in the form of a tortuous electrical conductor.

6. A tag as in claim 5, wherein said second portion of said electrical circuit is in the form of a tortuous electrical conductor.

7. A tag as in claim 1, wherein said first portion of said electrical circuit is in the form of a tortuous electrical conductor.

8. A tag as in claim 1, wherein said second portion of said electrical circuit is in the form of a tortuous electrical conductor.

\* \* \* \* \*